(No Model.)
H. H. KIMBALL & C. E. PERRY.
WRIST PIN LUBRICATOR.
No. 273,856. Patented Mar. 13, 1883.
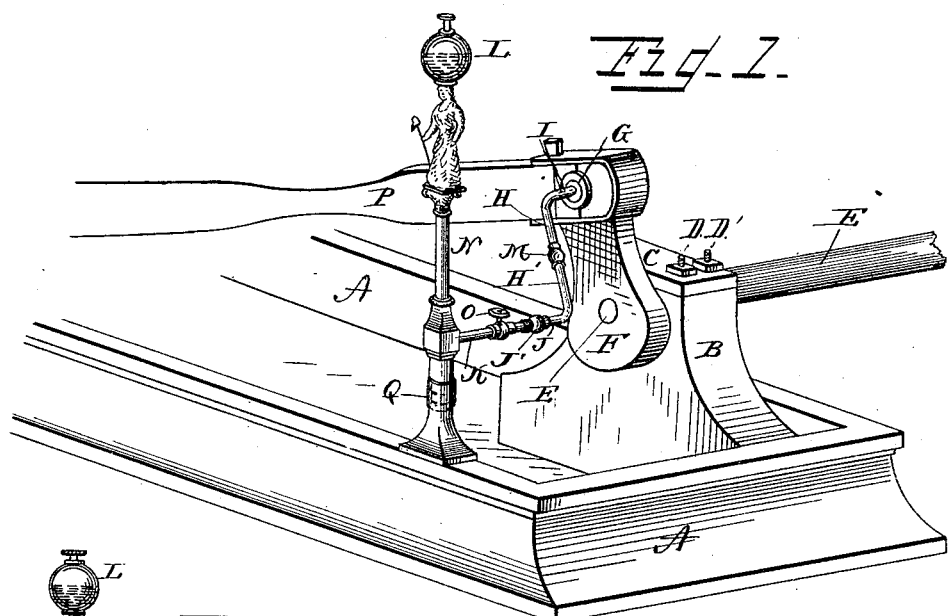
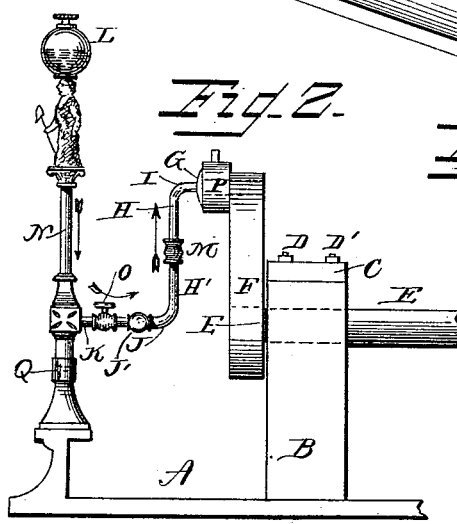
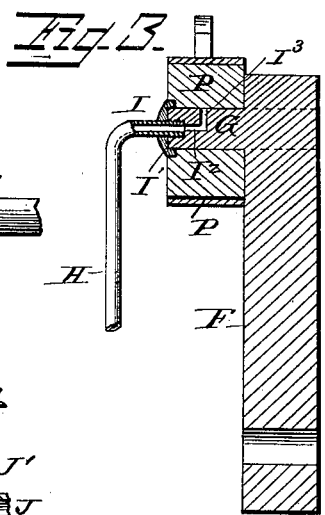
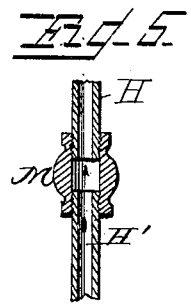
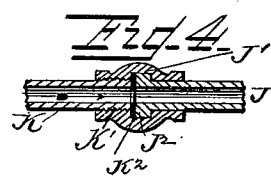
WITNESSES
Franck L. Ouraud
C. J. Williamson
INVENTOR
H. H. Kimball & Chas E. Perry
By Frank A. Fouts
Attorney
N. PETERS, Photo-Lithographer, Washington, D. C.

UNITED STATES PATENT OFFICE.

HENRY H. KIMBALL AND CHARLES E. PERRY, OF BLOOMINGTON, ILLINOIS.

WRIST-PIN LUBRICATOR.

SPECIFICATION forming part of Letters Patent No. 273,856, dated March 13, 1883.

Application filed January 15, 1883. (No model.)

*To all whom it may concern:*

Be it known that we, HENRY H. KIMBALL and CHARLES E. PERRY, citizens of the United States of America, residing at Bloomington, in the county of McLean and State of Illinois, have invented certain new and useful Improvements in Wrist-Pin Lubricators, of which the following is a specification, reference being had therein to the accompanying drawings.

Our invention relates to lubricators adapted to oil automatically the wrist-pin of an engine, all of which will be more fully hereinafter described, and pointed out in the claims.

In the accompanying drawings, Figure 1 represents a perspective view of the oiler in position on a stationary engine, only the bed-plate and the parts of said engine requisite for the illustration being shown. Fig. 2 discloses a rear elevation of the parts shown in Fig. 1, the wrist-pin appearing in dotted lines. Fig. 3 is a central longitudinal section through the crank-arm and wrist-pin, showing a threaded recess in the end of said wrist-pin and a right-angled continuation of said recess, communicating with the surface of the pin. In this view the connecting end of the oil-pipe is shown in position, the intersected threaded end thereof being shown in section and secured in the threaded recess of the pin. Fig. 4 represents a sectional view of the horizontal swivel-joint in which the pipe-crank turns, the arrow indicating the course of the oil through the joint and the connected ends of the pipe secured therein. Fig. 5 is a central section through the right and left joint which unites the main stems of the pipes, and by means of which said pipes are longitudinally adjustable.

Similar letters refer to similar parts throughout the several views.

A represents the bed-plate of an engine, and B a standard supporting the main shaft.

C is a cap-plate on standard B, secured by bolts and nuts D D'.

E indicates the main shaft, and F the crank-arm, keyed or otherwise secured thereon.

G is the wrist-pin on arm F.

H represents a pipe having a short right-angled bend, I, therein, the ends of said pipe being threaded.

I' is a threaded recess in the end of pin G, and $I^2$ a smooth continuation, of less diameter, thereof.

$I^3$ is an opening in the face of the wrist-pin, communicating with opening $I^2$.

H' represents a pipe having a right-angled end, J, provided with a collar, $J^2$, whereby the end J has a swivel-connection with joint J'.

K represents a short pipe with outer surface threaded end K', by means of which it engages the inner threads of joint J'.

$K^2$ is a washer in joint J' between the ends of pipes J and K. The inner end of pipe K has a communicating connection with the vertical stationary oil-pipe N, said oil-pipe being surmounted by a glass oil-tank, L.

O indicates a globe-valve adapted to regulate the flow of oil.

M is a right-and-left-threaded joint connecting the pipes H H'.

P represents the main engine-rod; and Q is a right-and-left-screw-threaded joint on the lower part of standard N to effect the vertical adjustment of said standard. The connecting ends of said standard, where they engage the joint Q, are threaded, the threads being on the inside of the joint and on the outer ends of the standard at that point, none of these threads, however, being shown. It will thus be seen that by means of the joints M and Q a nice adjustment can be effected, whereby the axis of pipe J K can be quickly brought into the plane of the axis of the main shaft E; and, again, by means of the threaded end I' of the pipe I and the joints Q M our improvement can be easily attached to and detached from a wrist-pin.

The device is operated as follows: Fill the oil-tank L and turn on cock O so as to admit the requisite flow of oil. A direct communication is then established between the tank L and the surface of the wrist-pin, the oil moving in the course indicated by the arrows. The arm I of pipe H is firmly secured in the recess I' of the wrist-pin. The pipe H' being connected to pipe H by joint M, as indicated, said pipes and joint lie and move parallel with the crank-arm F. The swivel-joint J' and pipe K are fixed to the vertical pipe N. The axes of the right-angled end J, joint J', and pipe K are on a line with the axis of the main shaft E. Therefore when the shaft E is revolved the crank F, wrist-pin G, pipes H H', joint M, and right-angled pipes I J are revolved with it. The pipe J and its collar $J^2$ are thereby caused to revolve in the joint J'. The oil passes downward through the pipe N, and thence out into the pipes H H'. Said oil is then forced centrifugally into the opening in the center of the wrist-pin, and thence out onto the surface of said pin, whereby said surface is lubricated.

It is obvious that a ball-and-socket joint may be substituted for the collar J² and joint J'.

We are aware that it is not new to convey oil from a stationary tank provided with a fixed pipe to a revolving pipe communicating with a wrist-pin. We therefore do not claim such, broadly; but What we do claim and desire to secure by Letters Patent, is—

1. The pipe N, surmounted by tank L, and the vertically-adjustable joint Q, in combination with the pipe K and globe-valve O, substantially as described, and for the purposes set forth.

2. The pipe-standard N, pipe K and valve O, the pipe K being provided with joint J', adapted to receive and provide a swivel-bearing for the shoulder J² on pipe J, substantially as specified.

3. The standard-pipe N, adjustable joint Q, pipe, and globe-valve O, substantially as described, and for the purposes set forth.

4. The standard N, pipe K, valve O and joint J', in combination with the pipes H H' J and joint M, substantially as described, and for the purposes set forth.

5. In combination with the wrist-pin of an engine, the pipes I H H', and right-and-left-hand joint M, the wrist-pin having a recess communicating with the surface thereof, the outer end of said recess being adapted to receive and secure the pipe I, in the manner and for the purposes specified.

6. The wrist-pin G, constructed as described, the pipes I H H' J, and joint M, in combination with the swivel joint J', substantially as described, and for the purposes set forth.

7. The wrist-pin G, constructed as described, the pipes I H H' J, and joint M, in combination with the swivel-joint J' and pipe K, provided with the globe-valve Q, the pipe K, intersecting pipe N, substantially as described, and for the purposes set forth.

In testimony whereof we affix our signatures, in presence of two witnesses, this 6th day of November, 1882.

HENRY H. KIMBALL.
CHARLES E. PERRY.

Witnesses:
R. S. McINTYRE,
FRANK R. FERGUSON.